United States Patent [19]

Suarez-Gonzalez et al.

[11] Patent Number: 5,265,036

[45] Date of Patent: Nov. 23, 1993

[54] TURBINE PYROMETER SYSTEM FOR CORRECTION OF COMBUSTOR FIREBALL INTERFERENCE

[75] Inventors: Ernesto Suarez-Gonzalez, Tequesta; Raymond L. Oglukian, North Palm Beach; Christopher Steinauer, West Palm Beach, all of Fla.

[73] Assignee: United Technologies Corporation, Hartford, Conn.

[21] Appl. No.: 925,817

[22] Filed: Aug. 4, 1992

Related U.S. Application Data

[63] Continuation-in-part of Ser. No. 659,772, Feb. 25, 1991, abandoned.

[51] Int. Cl.⁵ .......................... G06F 15/20; G01J 5/60
[52] U.S. Cl. ..................................... 364/557; 356/45; 374/127; 374/144
[58] Field of Search .............. 356/43, 45; 374/127, 374/168, 123, 125, 131, 130; 364/431.02, 557, 550

[56] References Cited

U.S. PATENT DOCUMENTS

| | | | |
|---|---|---|---|
| 4,222,663 | 9/1980 | Gebhart et al. | 356/45 |
| 4,657,386 | 4/1987 | Suarez-Gonzalez et al. | 356/45 |
| 4,666,297 | 5/1987 | Suarez-Gonzalez | 356/45 |
| 4,681,434 | 7/1987 | Kepple | 356/45 |
| 4,708,474 | 11/1987 | Suarez-Gonzalez | 356/45 |
| 4,764,025 | 8/1988 | Jensen | 356/45 X |
| 4,765,752 | 8/1988 | Beyon et al. | 356/45 X |
| 4,779,977 | 10/1988 | Rowland et al. | 356/45 |
| 4,797,006 | 1/1989 | Masom | 356/43 X |

*Primary Examiner*—Kevin J. Teska
*Attorney, Agent, or Firm*—McCormick, Paulding & Huber

[57] ABSTRACT

A pyrometer system for use in measuring the temperature of components in an operating jet engine corrects for random interference in the pyrometer temperature signal caused by radiation from the combustor flame. An optical beam from a periodically moving target engine component such as a turbine blade is provided to a detector module which splits the beam into two beams, one of which has a spectral width less than that of the target beam. Temperature signals are generated by a multiple spectral area pyrometer which are provided to a signal processor for correction. The signal processor compares present target temperature signal values sampled at selected phases during the target period with corresponding ones taken in an earlier period. Previous signals are averaged or replaced with current values if these meet criteria involving one or two temperature signals, noise band and magnitude.

22 Claims, 4 Drawing Sheets

TURBINE PYROMETER SYSTEM FOR CORRECTION OF COMBUSTOR FIREBALL INTERFERENCE

This is a continuation-in-part of co-pending application Ser. No. 07/659,772 filed on Feb. 25, 1991 now abandoned.

TECHNICAL FIELD

This invention relates to optical pyrometers and more particularly to optical pyrometers that correct for the presence of combustion fireball interference in the field of view.

BACKGROUND OF THE INVENTION

Optical pyrometers are well known in the art, having found extensive use in applications in severe environments or where temperature magnitudes prohibit the use of conventional contact pyrometric techniques. These devices calculate the temperature of a target from the radiant energy provided therefrom. An algorithm is used to determine the temperature of the surface by measuring total radiation in a given wavelength interval or by looking at the distribution of optical energy as a function of wavelength. The higher the temperature of the source, the greater the proportion of optical energy in the shorter wavelengths.

Optical pyrometers have been developed to measure the temperature of turbine blade surfaces even in an operating jet engine whose environment necessarily includes the combustor flame fireball. Pyrometers in jet engine applications provide a temperature indication to the electronic engine control system which sets the engine operating point. In jet engine development, pyrometers are used to validate designs and provide measurement of critical parameters such as combustor exit temperature. To accurately measure the turbine blade temperature, the optical pyrometer must be capable of correcting the measurements to eliminate the effect of high levels of radiation from the combustor flame which obscures the radiation emitted by the turbine blade.

Multiple spectral area optical pyrometers have been developed in order to differentiate between reflected and emitted radiation received from a target turbine blade and compensate for the error in the observed temperature that the reflected radiation introduces. In U.S. Pat. No. 4,222,663; incorporated herein by reference, Gebhart, et al discloses a dual band (two color) optical pyrometer which comprises two separate pyrometers. Each pyrometer sees a different but overlapping component of the total spectral range of the light or radiation from the turbine blade.

The pyrometers are sensitive at different wavelength bands and will be affected differently by the energy from the turbine blade surface. When the light (radiation) from the fireball is reflected off the blade, the pyrometer set to detect the shorter wavelength band is more responsive to the additional reflected energy, and is output signal increases in greater proportion than does that of the longer wavelength pyrometer. Therefore, an increase or decrease in the amount of the reflected radiation or, at high reflection conditions, to the temperature of the combustion flame will result in a proportionally higher or lower value of temperature indicated in the short wavelength pyrometer.

For each pyrometer an algorithm calculates the temperature of the turbine blade from the light it receives. The reflected energy of the much hotter combustion flame causes each of the two pyrometers to yield different temperature values, both higher than the true blade temperature. An additional temperature correction algorithm receives each channel temperature and determines the magnitude of the temperature error. The temperature correction signal is a function of the difference between the two pyrometer temperatures, which results from the spectral range of each pyrometer, the fireball equivalent blackbody temperature and the fraction of reflected radiation present in each pyrometer signal.

U.S. Pat. No. 4,797,006 to Masom, incorporated herein by reference, discloses a pyrometer system for use with a gas turbine engine that provides output signals to a processor indicative of the temperature of rotating blades in a gas turbine engine. The processor includes a synchronization unit and a gate controlled by the synchronization unit after monitoring the output of the pyrometer to identify which parts of the output signal rise from the radiation from the blades and which arise from combustion chamber. The synchronization unit is set in synchronism with the blade signals and the gate is controlled to pass signals from the blade to interrupt signals arising from the combustion chamber. The output of the processor is thereby indicative of the blade temperature.

Multiple-spectral band pyrometers have been developed to measure and correct for the reflected radiation. U.S. Pat. No. 4,708,474, also incorporated herein by reference, describes a dual spectral area pyrometer (DSAP) which is based on the principal that two blackbody calibrated pyrometers sensitive to different wavelengths will not respond equally when subjected to a radiative input containing surface emitted radiation plus reflected radiation from a another source at a much higher temperature. The '474 pyrometer includes an optical guide for receiving from the target an optical beam that has an emitted component from the target and a reflected component from a fireball. A detection module receives and divides the target optical beam into first and second optical beams and provides electrical signal equivalents thereof. The second optical beam is selected to have a spectral width that is a portion of the target beam spectral width. Also included in the '474 pyrometer is a signal processor that provides for receiving the first and second signals as well as an energy ratio signal. The signal processor provides reflection corrected energy signals from a difference between the first signal and the product of the energy ratio signal and the second signal.

It is well known that pyrometer systems measuring turbine blade temperatures in jet engines are subject to radiation from three different sources. The pyrometer simultaneously collects reflected radiation from surrounding surfaces, radiation from combustion (flame) in the pyrometer field of view and radiation emitted by the blade. The radiation emitted by the blade is the component required to measure the blade temperature. Consequently, the contribution by reflection in the flame must be subtracted from the total radiation collected by the pyrometer. The '006 and '474 Patents describe systems with methods to subtract these two components subject to certain restraints and conditions in the input signal.

The three radiative components behave differently. At a steady state operating point, only the blade emitted component remains constant. The flame and reflected signal componentry vary between the blades and for the same blade from one engine revolution to the next. The flame component varies randomly in intensity and location as the pyrometer field of view sweeps over the blade surface. Depending on the jet engine power setting, the intensity reaches a level which can saturate the signal detectors and processors for a large portion of the turbine revolution. At the same time, the intensity of the reflected component varies along the blade surface. This variation is driven by geometry and view factors. The intensity of the reflected radiation depends on the luminosity emitted by the combustor and it varies with time.

However, these multiple spectral area pyrometers do not correct for random signal saturation caused by the thermal emission of combustion in the field of view commonly referred to as "flame". The spectral characteristics of the combustor must be known. In jet engines the pyrometer signal can be affected by flame for a significant portion of a rotor revolution. Under such conditions turbine blade temperatures cannot be monitored.

SUMMARY OF THE INVENTION

An object of the present invention is to provide a pyrometer system having an apparatus for correcting interference with the measurement of a target temperature caused by the presence of combustor flame in the optical beam.

Another object of the present invention is to provide a multiple spectral band pyrometer system that corrects for random temperature signal interference caused by the presence of combustor flame in the optical beam.

Still another object of the present invention is to provide a pyrometer system of the forgoing type which is capable of operating in an abort mode sensing maximum target temperature and a profile mode sensing target temperature over a specified temporal or special repetitive period.

Another object of the present invention is to provide a pyrometer system of the forgoing type that corrects for variations in signal caused by changes in the periodic movement of target elements.

According to the present invention, a pyrometer system for measuring the temperature of a remote, periodically moving target includes a sensor for providing electrical signal equivalents of an end of each of the target periods and an optical filter for receiving a portion of a target optical beam having a spectral width including an emitted component and a reflected component as well as a flame component occurring randomly during the target period and passing therethrough an optical sub-beam having a portion of the optical beam spectral width. First and second detectors provide electrical signal equivalents of measured energy in the optical beam and the optical sub-beam. A memory is provided for storing signals indicative of a plurality of target temperature signals corresponding to associated ones of a plurality of energy signal magnitudes. An apparatus is provided for sampling the optical beam energy signals at selected phases of a target period as is an apparatus for respectively relating the received optical beam and the optical sub-beam power signals to signals indicative of a plurality of target temperature signals corresponding to associated ones of a plurality of optical beam and optical sub-beam energy signal magnitudes. An apparatus further compares sampled optical beam and optical sub-beam temperature signals of a first one of the target periods with corresponding ones of optical beam and optical sub-beam temperature signals sampled in a subsequent target period and retains the subsequent target period sampled temperature signals if the respective magnitudes of the subsequent target period sampled temperature signals is less than the respective magnitudes of the first target period sampled temperature signals. The pyrometer system also includes an apparatus for outputting the retained optical beam and optical sub-beam temperature signals.

According to another aspect of the present invention, a pyrometer system for measuring the temperature of a remote target that periodically moves relative thereto by means of an optical guide that receives a target optical beam having a spectral width and a beam power and that has an emitted component, a reflected component and a combustor fireball component occuring randomly during a target period. The pyrometer system includes a sensor providing electrical signal equivalents of the end of each of the target periods and a detector provides respective electrical signal equivalents of the received energy in the optical beam. A memory for storing signals indicative of a plurality of target temperature signals corresponding to associated ones of a plurality of energy signal magnitudes is included. An apparatus is included for converting the received optical beam and sub-beam energy signals corresponding ones of the stored temperature signals. Further, an apparatus compares sampled optical beam and optical sub-beam temperature signals of a first one of the target periods with corresponding optical beam and optical sub-beam in a subsequent target period and retains the subsequent target period sampled optical beam temperature signals sampled signals if the magnitude thereof is less than the peak-to-peak noise and and optical sub-beam averages both respectively the optical beam and optical sub-beam signal values if they are within the peak-to-peak noise.

According to another aspect of the present invention, a pyrometer system for measuring the temperature of a remote target that periodically moves relative to the pyrometer system during a target period includes a sensor for providing electrical signal equivalents of an end of each of the target periods, an optical filter for receiving a portion of a target optical beam having a spectral width and passing therethrough an optical sub-beam having a portion of said optical beam spectral width. Both the optical beam and the optical sub-beam have a target emitted component, a target reflected component and a flame component occurring randomly during the target period. The system includes first and second detectors for providing electrical signal equivalents of measured energy in the optical beam and the optical sub-beam. A memory for storing signals indicative of a plurality of reflection corrected target temperature signals corresponding to associated ones of a plurality of reflection corrected energy signal magnitudes is provided as is an apparatus for sampling the optical beam electrical signals and the optical sub-beam electrical signals at selected phases of a target period. There is an apparatus that, for each of the phases, generates reflection corrected energy signals from the optical beam and optical sub-beam energy signals. There is an apparatus that, for each of the phases, correlates the sampled reflection corrected energy signals with corresponding reflection corrected target temperature signals as well as an apparatus for comparing, for each of the phases, reflection corrected target temperature signals sampled in a first target period with corresponding reflection corrected target temperature signals sampled in a subsequent target period. The system also includes an apparatus for retaining, for each of the phases, the reflection corrected target temperature signal from the subsequent target period if the subsequent target period reflection corrected target temperature signal is less in magnitude than the reflection corrected target temperature signal from the first target period. An apparatus computes an average value of the retained reflection corrected target temperature signals. Also, there is an apparatus for outputting an alarm signal should the average reflection corrected target temperature signal exceed a threshold value.

DESCRIPTION OF THE PREFERRED EMBODIMENT

Figure 1:
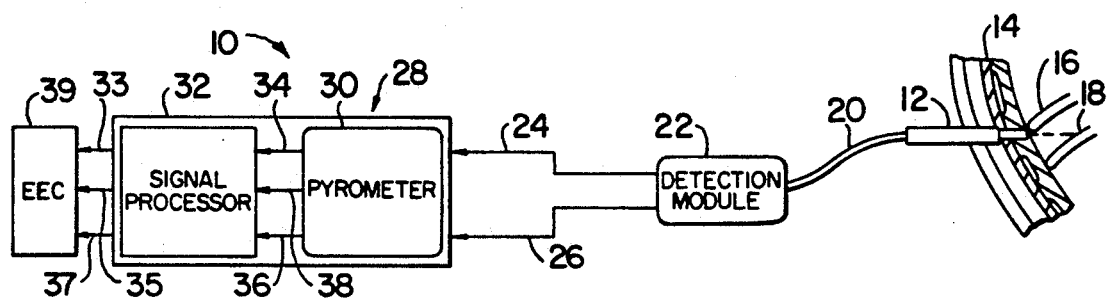
FIG. 1 is a block diagram of a pyrometer system provided according to the present invention

FIG. 1 is a simplified block diagram of a pyrometer system 10 provided according to the present invention. The pyrometer system includes a probe 12 mounted in a casing 14 of a gas turbine jet engine. The probe should be positioned to optically view a target including rotating turbine blades 16 and 18.

In an operating jet engine the blades of the turbine emit thermal radiation, the intensity and spectral distribution of which is described by Planck's law of radiation. If variations in emissivity are taken into account, the approximation is conventionally referred to as a "grey body". In addition, light from the jet engine combustion flame or fireball is reflected off the turbine blade. The temperature of the fireball is substantially higher than that of the turbine blade, and the sum of the two light beams produces a spectral energy distribution which yields a signal corresponding to a temperature higher than the actual temperature of the turbine blade.

The sum spectral energy, or target optical beam, from the turbine blades is collected by the probe. The probe may include lenses and such other conventional optical components as is necessary to enhance the probe's light gathering and focusing capabilities. In other aspects the probe is of a conventional design, and includes such elements as a housing for the optical fiber, internal optical reflection damping mechanisms, and provisions for purge gas flow through the probe housing. Those skilled in the art will recognize that substitutions and modifications can be made depending upon the pyrometer application.

An optical guide 20 provides the target optical beam to detection module 22. Typically the guide comprises a fused fiber optical bundle or equivalently a conventional wide band quartz or fused silica fiber. The detection module is also conventional and divides the target optical beam into two or more components. For the two component case, a first photodetector (not shown) absorbs a first one of the components having a spectral width selected to be a portion of the target optical beam. A second photodetector (not shown) receives the remaining target optical beam.

The photodetectors typically comprise silicon and have a spectral response from 0.4 microns through 1.1 microns. A difference in spectral bandwidth is preferably created by inserting a conventional optical filter before the first photodetector, limiting the spectral band for that photodetector to 0.4–0.85 microns. Those skilled in the art will note that widths of the spectral bands can vary and should be selected according to the application. Other detectors such as Indium Gallium Arsenide may be used. Various configurations of photodetectors can be used. See for example the photodetectors disclosed in U.S. Pat. No. 4,681,434 and incorporated herein by reference.

The first photodetector provides signals on lines 24 which are indicative of the target optical beam first component energy signal (Ef) and the second photodetector provides signals on line 26 indicative of the target optical beam second energy signal (Eu). Those signals are received by controller 28 that includes dual or multiple spectral area pyrometer 30, and a signal processor 32. The pyrometer computes temperature signals (Tu, Tf, Tt) on lines 34, 36, 38 respectively corresponding to the first and second optical beam and corrected energy signals (Eu, Ef, E). Corrected energy signal magnitudes are calculated as the difference between the signal of the unfiltered beam and the product of the signal in the filtered beam and the ratio of reflected power signal in the unfiltered beams (R).

$$E = Eu - REf \qquad (1)$$

The ratio R is derived from the spectral characteristics of the combustor fireball often expressed in terms of an equivalent blackbody temperature. The parameter E is directly related to the true temperature of the blade. Although the relationship is double valued over a range of temperatures, it is single valued over the temperature range of interest.

The present invention describes a pyrometer system that separates the flame interference from other radiative signals in jet engine pyrometer signals. Flame interference manifests itself in the temperature signals as random signal saturation which occurs when surrounding radiation overwhelms the radiation emitted by the blade resulting in an erroneously high indicated temperature. As detailed hereinafter, signals indicative of an abort situation (over-temperature), pyrometer system failure and turbine blade temperature profile are respectively provided on lines 33, 35, and 37 to electronic engine control (EEC) 39.

Figure 2:
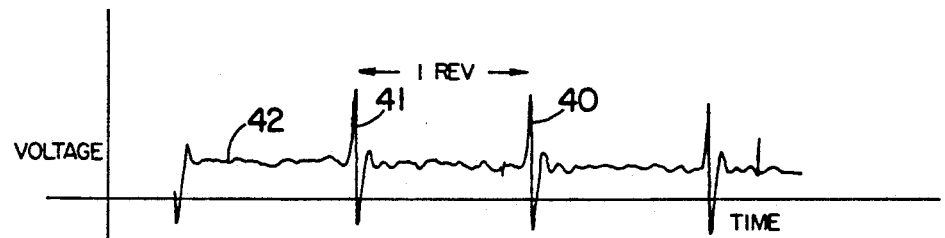
FIG. 2 is a waveform illustration of a timing signal used by the pyrometer system of FIG. 1.
Figure 4:
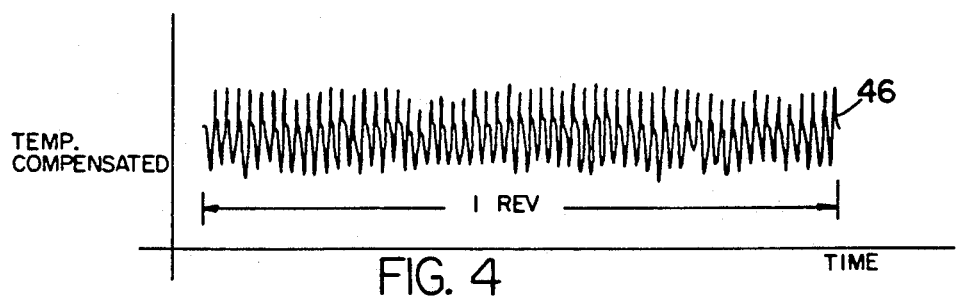
FIG. 4 is a waveform illustration of a compensated temperature signal generated by the pyrometer system of FIG. 1.

FIGS. 2 and 4 respectively illustrate, at curves 42, 44, and 46, a once per turbine revolution signal, an uncompensated temperature signal and a compensated temperature signal provided by the present invention, all as a function of turbine blade angular position. A periodic signal spike 41 in FIG. 2 marks the beginning and end of one turbine revolution. The occurrence of saturation and flame interference in a pyrometer signal (curve 44) is random with respect to time at a given turbine angular location. As shown at curve 46 of FIG. 4, the present pyrometer corrects this error under quasi steady-state engine operating conditions by continuously recording the temperature at the same location on the blade airfoil.

The values of temperature signals (Tu, Tf, Tt) of the initial or baseline revolution are compared to values in subsequent revolutions. Temperature points in the baseline revolution are only replaced if the difference between the retained point and the new point, for one of the temperature channels, is less than the peak-to-peak noise and, for the second channel, if the temperature point is less than the retained point or within the peak-to-peak noise. This process is performed simultaneously for each retained temperature point in both temperature channels. The process continues until all points in the revolution are compared to the points contained in the baseline revolution. The baseline revolution continues to be updated until the selected number of revolutions has been processed. This procedure is referred to as "MinPic".

For pyrometers of the present type, temperature signal noise varies inversely and non-linearly with temperature. When correcting for presence of a signal portion due to flame, successive replacement of high temperatures values with low ones will bias the final temperature toward the lower portion of the noise envelope. This bias is prevented with the present invention by the processor calculating a continuous weighted average of all replaced temperature values. The present pyrometer can be operated in two modes. Abort mode operation provides turbine over-temperature protection during engine tests, while the profile mode operation provides accurate temperature signals over the turbine blade airfoil for design verification. To provide engine over-temperature protection, an abort signal is sent by the processor to the engine control system. Customarily, the average of the blades maximum temperature (average peak) is used for the abort signal which must be updated several times per second to provide adequate protection.

Figure 3:
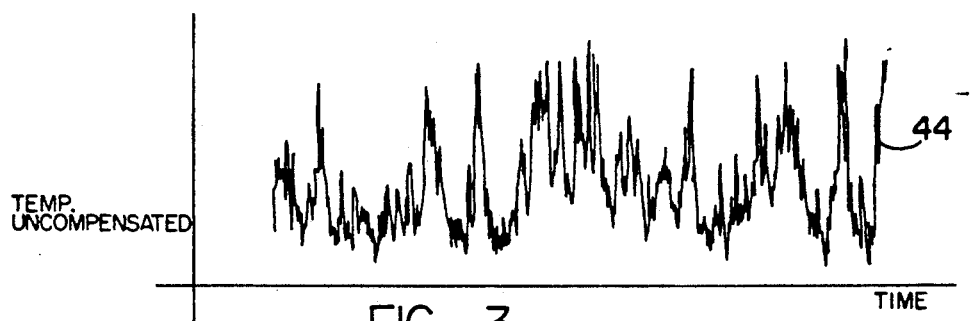
FIG. 3 is a waveform illustration of a temperature signal used by the pyrometer system of FIG. 1.

Data acquisition, for both modes, consists of sampling, at a given rate for a fixed number of samples at selected phases, two temperature signals and one signal indicating turbine rotor position as shown in FIGS. 2-4. A sufficient number of signal samples are acquired to cover at least one rotor revolution. The first revolution sample data set becomes the baseline data set to which data in successive revolutions will be compared. A sample by sample comparison is made between samples having the same phase in successive revolutions. A new data sample can replace or be averaged with the sample in the baseline revolution if certain criteria ar met in accordance with an algorithm detailed hereinafter. The criteria are preferably selected by the operator based on temperature level and signal noise. Different criteria are used for profile and abort operation. Data replacement criteria and period or sample cycle length may also be based on other parameters such as time per output signal updates, the number of turbine revolutions and the fraction of the data signals retained per revolution. The present pyrometer system is capable of generating plots of the percent of data replaced, the percent of data averaged, the average peak temperature per revolution and the blade profile for a revolution of data accumulated during the profile MinPic process.

The following is a glossary of terms as used herein:

| | |
|---|---|
| A/D | analog to digital converter |
| Cl | number of signal samples in a baseline revolution |
| CLn | correction interval |
| Cn | number of signal samples in the Nth revolution |
| CNT | correction location |
| CPn | location for first correction |
| CPU | central processing unit |
| D/A | digital to analog converter |
| FiFo | first in first out dual port buffer memroy |
| n | array index for non-correlated data signals, from 1 to Cn |
| NTf | peak-to-peak noise signal for short wavelength temperature |
| NTt | peak-to-peak noise signal for reflection corrected temperature |
| NTu | peak-to-peak noise signal for long wavelength temperature |
| m | array index for correlated data signals, from 1 to Cl |
| RAM | random access memory |
| Tf | short wavelength temperature data signals |
| TFc(m) | array of correlated short wavelength temperature data signals |
| TFMP | minimum values of short wavelength temperatures |
| Tfp | short wavelength temperature data signals, profile processing |
| Tfs | baseline short wavelength temperature data signals |
| Tt | reflection corrected temperature data signals |
| Tta | reflection corrected temperature data signals, abort processing |
| Ttavgpk | reflection corrected temperature average of maximum blades temperature |
| Ttc(m) | array of correlated reflection corrected temperature data |
| TTMP | minimum values of reflection corrected temperature |
| Tt(n) | array of non-correlated reflection corrected temperature data signals |
| Ttp | reflected corrected temperature data signals profile processing |
| Tts | baseline reflection corrected temperature data signals |
| Tu | long wavelength temperature data signals |
| Tua | long wavelength temperature data signals, abort processing |
| Tuc(m) | array of correlated long wavelength temperature data signals |
| TUMP | minimum values of long wavelength temperatures |
| Tu(n) | array of non-correlated long wavelength temperature data signals |
| Tup | long wavelength temperature data signals, profile processing |
| Tus | baseline long wavelength temperature data signals |

Figure 5:
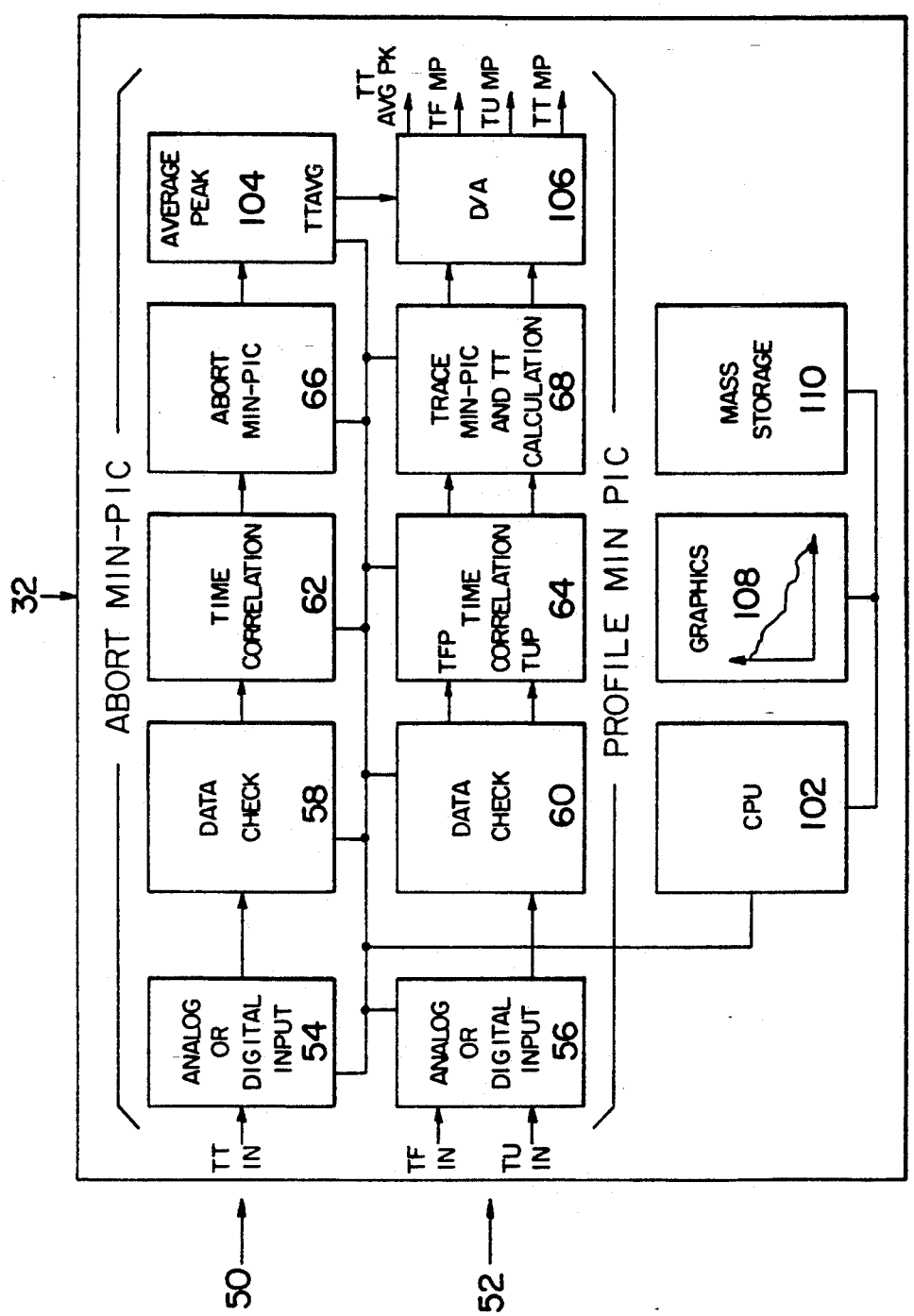
FIG. 5 is a simplified schematic illustration of a signal processor used by the pyrometer system of FIG. 1.

A simplified schematic representation of the signal processor is shown in FIG. 5. The preferred processor overall comprises two sections 50, 52 for the abort and profile operation modes, respectively. Input signals to the signal processor may be in analog or 12 bit digital form with either one or two temperature signals for input. For an analog input, the data signals are sampled by high speed A/D converters 54, 56 associated with the processor which convert the data signals to digital form. For digital signal input this step is omitted. The purpose of the data check operation performed by data check circuitry 58, 60 is twofold. First, it compares the absolute level, relative level and the difference between temperature Tf signals Tt, and Tu to the operator selected value for the profile MinPic section, and processes the data signals only if the following criteria are satisfied:

| | |
|---|---|
| Tu | < operator selected value |
| Tt | < Tu |
| Tu-Tf | < operator selected value; |

If these criteria are not met Tup, Tfp and Ttp are replaced with the maximum temperature allowed to ensure that during processing these values are discarded. Lastly, it stores the input data signals into a separate set of FiFo's for use by CPU 102 as necessary. Other criteria may be used for multiple spectral bands processing any two of the temperature signals available.

To perform a valid comparison, the data signals should be sampled from the same physical point on the turbine blade airfoil in successive revolutions. Each blade is located at a selected angular position along the rotor. Therefore, the pyrometer signals should be sampled at the same phases in each revolution and the number of sampled pyrometer signals contained in a turbine rotor revolution should stay constant throughout a MinPic signal processing cycle, assuming a constant rate of data sampling as in the preferred embodiment.

Due to slight engine variations in rotational speed however, an adjustment is necessary. Successive rotor rotations can have more or less data signal samples as compared to the first, baseline revolution. The difference in the number of samples per revolution is determined and samples are linearly inserted or deleted to make the number of data signal samples equal to that of the baseline revolution. A revolution with more or less samples than the baseline the revolution will be divided into a number of sections equal to the number of data signal samples to be adjusted. As an example, in a revolution having four more samples than the baseline revolution, the data signal samples will be divided into four sections and one sample deleted at the center of each. Adding points is done similarly by repeating the center point value.

In the preferred embodiment correlation circuitry 62, 64 counts the number of samples (Cn) in each revolution and adjusts that number to be the same as the first baseline revolution (Cl) as detailed above. A signal pulse generated in a known manner for every revolution at a fixed turbine rotor location is used as the reference signal. The calculated correction is not necessarily an integer number. By multiplying Cn by a base two number such as 16, the necessary accuracy is maintained while using integer arithmetic which allows the process to occur in real time using relatively simple processing hardware.

The number of adjustment samples and their location is given by:

$$CLm = ABS((Cn*16)/(Cl-Cn)) \quad (2)$$

$$Cpn = CLn/2$$

If Cn is smaller than Cl, the time correlation is performed as follows:

```
Set CNT = CPn
for n = 1, M = 1 to m = Cn
{ (transfer temperature sample directly)
    Tuc(m) = Tu(n)
    Tfc(m) = Tf(n)
    Tuc(m) = Tu(n)
(increment correlated data array)
    m = m + 1
if n * 16 > = CNT
{ (duplicate this sample in the correlated data array
    with the following operations)
    Tuc(m) = Tu(n)
    Tfc(m) = Tfn
    Tuc(m) = Tu(n)
(set the location for the next adjustment sample)
    CNT = CNT + CLn
(increment corrected data array)
    m = m + 1
}
(increment the non-correlated data array)
    N = n + 1
} (process the next sample)
```

If Cn is larger than Cl the time correlation is performed as follows:

```
set CNT = CPn
for n = 1, M = 1 to m = Cl
```

```
-continued
{ if n * 16 > = CNT
{ (skip this sample in the correlated data array with
    the following operations)
    (set the location for the next adjustment sample)
    CNT = CNT + CLn
    (and increment the non-correlated array)
    n = n + 1
}
    (transfer temperature sample directly)
    Tuc (m) = Tu(n)
    Tfc(m) = Tf(n)
    Tuc(m) = Tu(n)
    (increment index)
    m = m + 1
    n = n + 1
} (process the next sample)
```

Figure 6:
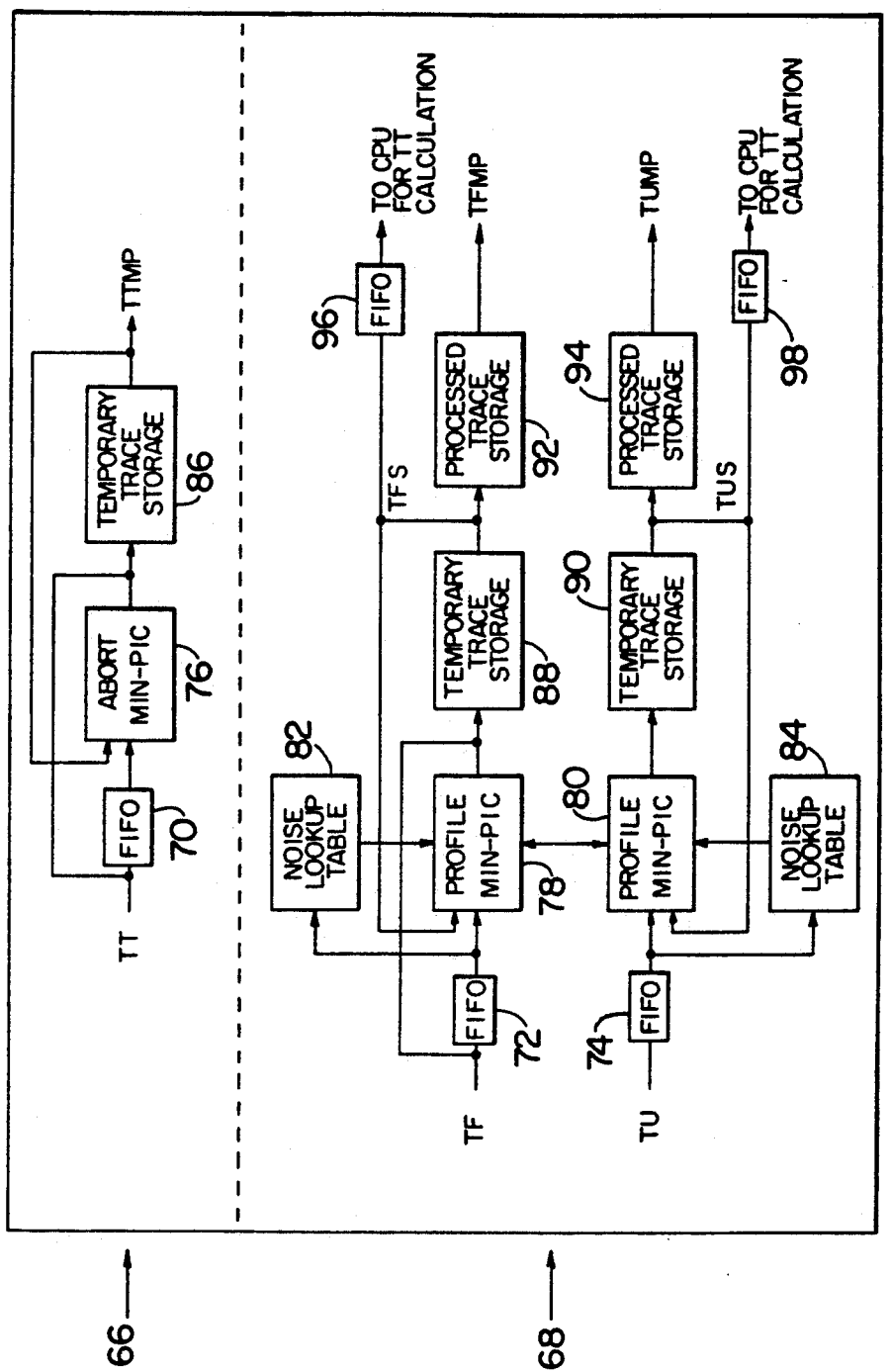
FIG. 6 is a detailed schematic illustration of sections of the signal processor of FIG. 5.

As the data signals are time correlated they are passed to both abort and profile MinPic processor subsections 66, 68. The MinPic operations are performed independently and simultaneously to allow the operator to select different cycle lengths for abort and profile processing. The MinPic processor subsections are shown in schematic detail in FIG. 6 and have short FiFo's 70, 72 and 74, 76 on the front end to buffer input data signal samples. Note that the first revolution is a special case. The data signal samples associated therewith are passed directly to the MinPic circuitry for storage until the second revolution begins. In order to increase the data processing speed, data acquisition, correlation, MinPic processing and output of processed data are all computed in parallel as data signals become available. The MinPic process is performed at its lowest level at blocks 76, 78, 80. The processor sections also comprise static RAM devices of a known type for storage of partially processed data signals 86, 88, 90 and the final profile data signals 92, 94. In addition, static RAM is provided for storage of the noise lookup tables 82, 84 used in the profile MinPic processing. The profile processor subsection 68 also contains FiFo's 96, 98 for temporarily storing Tus and Tfs signals for use by the central processing unit (CPU) 102.

For turbine overheating protection, processing time must be kept to a minimum. The minimum temperature selection (MinPic) is made to the reflection corrected temperature signal or the long wavelength signal as described above by abort processor subsection 66. In the abort processing mode, high temperature signal samples are replaced with lower ones without considering the noise signal bias. The error is not significant, since the data being used is the highest turbine blade temperature signal which, as noted above, has the minimum noise content. After the abort MinPic cycle is complete, the average of the maximum individual temperatures for all blades in the rotor is calculated by circuitry 104.

In the abort mode, the MinPic process is performed by repeatedly comparing the magnitude of the new Tt signal value to the stored value, Tts. If Tt is smaller, then Tt replaces Tts. This operation is repeated for some operator selected number of revolutions. When an abort MinPic cycle is completed, the next cycle starts by taking a new base revolution of size Cl at the next revolution signal pulse (see pulse 40, FIG. 2).

As the abort MinPic signal processing is performed, Tts signals are used to compute the average peak signal for each cycle through the data. This is performed by finding the peak signal sample value in a signal window whose size is determined by dividing Cl by the number of blades in the turbine rotor. The peaks are summed over a revolution and divided by the number of blades to obtain the average peak. The average peak for that revolution is then stored in a FiFo for use by the CPU. These computed data signals will be viewed by the user to determine the number of revolutions per cycle required to allow the average peak temperature to converge to some final value. After the last revolution of abort MinPic data is processed, the average peak is computed one final time and stored in a FiFo and the average peak of Tts is written to a D/A converter 106 for output to the engine monitoring system. The processor 32 also comprises computer graphics 108 for use in displaying the output signals and a mass storage device 110 for storage of control programs and acquired data.

A more rigorous MinPic algorithm is executed by the processor to calculate the blade temperature profile. This method of MinPic accounts for the noise in the signal giving a result representative of the true temperature, whereas the simple algorithm executed during the abort MinPic procedure tends to give a result which is biased to the bottom of the signal noise envelope. Prior to processing any data signal samples, the operator measures and stores in memory associated with the processor the average peak to peak noise in the pyrometer radiant power signal, or the peak to peak noise in the temperature signal at a given temperature. Those skilled in the art will note that the noise in the radiant power signal remains constant regardless of the temperature. However, the noise in the temperature signal varies inversely with temperature level in a non-linear fashion. From this information the processor generates a unique set of curves for Tu and Tf which describe the system noise over the operating temperature range. These curves are stored in look-up table format in processor RAM 82, 84.

In the profile mode, the temperature signals are only replaced if two conditions are met, (1) the difference between the retained signal and the new signal, for one of the channels, is less than the peak-to-peak noise signal value and, (2) for the second channel, the temperature signal is less than the retained signal or within the peak-to-peak noise. This process is performed simultaneously for each retained temperature signal in both temperature channels. The process continues until all signals in the revolution are compared to the signals contained in the baseline revolution. The baseline revolution continues to be updated until the operator selected number of revolutions has been processed. A MinPic profile cycle can also be established based on elapsed time or other parameters such as fraction of data replaced on the last cycle.

Figure 7:
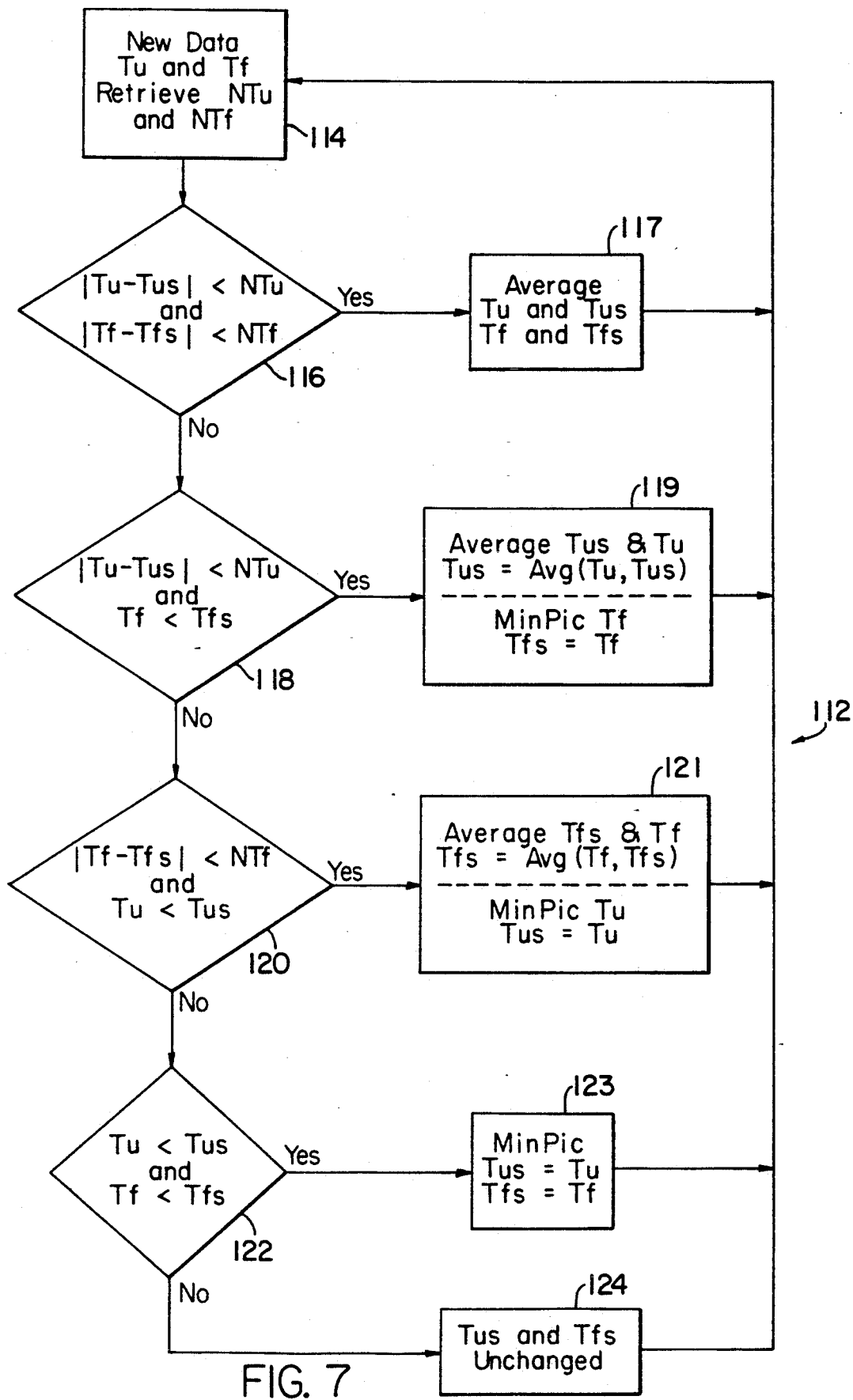
FIG. 7 is a diagrammatic illustration of an algorithm executed by the signal processor of FIGS. 5 and 6.

FIG. 7 diagramatically shows an algorithm 112 used to generate MinPic temperature profiles. To compare temperature signals, Tu and Tf, against the corresponding stored values, Tus and Tfs, the noise signal values, Ntu and NTf, are first retrieved at block 114 from noise look-up tables 82, 84 in the processor memory. If, at block 116, the magnitude of difference between the signals Tu and Tus is less than NTu and the magnitude of the difference between Tf and Tfs is less than NTf, a weighted average signal value of each channel is computed and replaces Tus and Tfs (block 117). The weighted average is calculated as follows and was selected as a compromise between a true running average and ease of implementation for operation in real-time.

WEIGHTED AVERAGE:

-continued $$Tus + \frac{Tu - Tus}{8} = \frac{7 * Tus + Tu}{8}$$

$$Tfs + \frac{Tf - Tfs}{8} = \frac{7 * Tfs + Tf}{8}$$

If both Tf and Tfs are not within their respective noise windows, then the processor, at block 118, determines if the magnitude of the difference between Tu and Tus is less than NTu and Tt is less than Tts - NTt/2. If these conditions are met, Tf and Tfs and a weighted average, as described above, is computed for Tu and replaces Tus (block 119). If the above criteria are not met, then the processor, at block 120, determines if the magnitude of the difference between Tt and Tfs is less than Ntu and Tu is less than Tus - Tf/2. If these conditions are met, Tu replaces Tus and a weighted average, as described above, is computed for Tf and replaces Tfs (block 121).

Finally, if any of the above criteria are not met then the processor, at block 122, determines if Tu is less than Tus - NTu/2 and Tt is less than Tts - NTt/2. If these conditions are met, Tu replaces Tus and Tf replaces Tfs (block 123). At this point, if none of the criteria are met, the processor does nothing to Tus and Tfs (block 124). It should be noted that this section of the processor performs its calculations using the temperature data multiplied by 16. This allows the circuitry to maintain good accuracy in computing the averages while keeping the processing circuitry very simple.

The number of revolutions per MinPic cycle are set under software control by an operator. To aid this selection, the CPU displays the percent of temperature points being averaged per revolution, the percent of temperature points being replaced per revolution and a plot of the blade profiles for one revolution. When the MinPic cycle is complete, the data is transferred to output trace buffers and the FiFo's. The data in the FiFo's are provided so the user can access the MinPic data for display or further processing. The data in the trace buffers are also continuously output by the D/A until the end of the next cycle at which time it is replaced with new data. The analog output trace on the display can be recorded and/or used as an input to a system (not shown) which can generate a thermal map of the blade temperature. Alternatively, thermal mapping can also be implemented in the present pyrometer system using the CPU for processing.

Similarly, although the invention has been shown and described with respect to a preferred embodiment thereof, it should be understood by those skilled in the art that various other changes, omissions and additions thereto may be made therein without departing from the spirit and scope of the present invention.

We claim:

1. A pyrometer system for measuring during a target period the temperature of a remote target that periodically moves relative to said pyrometer system, comprising:
   a sensor means for providing electrical signal equivalents of an end of each of said target periods;
   an optical filter means for receiving a portion of a target optical beam having a spectral width and passing therethrough an optical sub-beam having a portion of said optical beam spectral width, both said optical beam and said optical sub-beam having an emitted component and a reflected component and a flame component occurring randomly during said target period;

first and second detector means for providing electrical signal equivalents of measured energy in said optical beam and said optical sub-beam;

a memory means for storing signals indicative of a plurality of target temperature signals corresponding to optical beam and optical sub-beam energy signal magnitudes;

a means for sampling said optical beam electrical signals and said optical sub-beam energy signals at selected phases of said target period;

a relating means for respectively relating said received optical beam and said optical sub-beam energy signals to said stored target temperature signals;

a means for comparing, for each of said phases, target temperature signals corresponding to sampled optical beam and optical sub-beam energy signals of a first one of said target periods with ones of target temperature signals corresponding to sampled optical beam and optical sub-beam energy signals in a subsequent target period;

a means for retaining said subsequent target period temperature signals if the magnitude of a one of said subsequent target period temperature signals is less than the magnitude of the corresponding one of said first target period temperature signals; and a means for outputting said retained optical beam and optical sub-beam temperature signals.

2. The pyrometer system of claim 1 further comprising a means for providing signals indicative of a peak to peak magnitude of electrical noise in said optical beam and optical sub-beam energy signals.

3. The pyrometer system of claim 1 further comprising a means for halting the operation of said sampling means after a select number of said target periods.

4. The pyrometer system of claim 1 further comprising a means for halting the operation of said sampling means in dependence on the total number of said samples of said optical beam energy signals.

5. The pyrometer system of claim 1 further comprising a means for halting the operation of said sampling means in dependence on a total elapsed sampling time.

6. The pyrometer system of claim 1 further comprising a means for halting the operation of said sampling means in dependence on a number of subsequent target period sampled optical beam signals that have been retained by said signal processor means.

7. The pyrometer system of claim 1 wherein, if said optical beam temperature signal is less than a threshold value and greater than said corresponding optical sub-beam temperature signal and a difference value therebetween is less than a difference threshold value, said comparing means further including means for providing signals indicative of an error should either said optical sub-beam or said optical beam temperature signals exceed an absolute threshold value.

8. The pyrometer of claim 1 wherein, if said optical beam temperature signal is less than a threshold value and greater than said optical sub-beam temperature signal, said comparing means further for providing error signals should a difference value between said optical sub-beam and said optical beam temperature signals exceed a relative threshold value.

9. The pyrometer system of claim 1 further comprising a means for generating reflection corrected temperature signals from said retained optical beam and optical sub-beam temperature signals.

10. The pyrometer system of claim 1 further comprising a means for adjusting the length of said target period.

11. The pyrometer system of claim 10 further comprising a means for comparing the number of signal samples in a one of said target periods and comparing said sample number with a reference value therefor, said sample number comparing means further correcting the number of samples in subsequent target periods to equal said reference value.

12. The pyrometer system of claim 11 wherein said sample number comparing means further comprises means for generating a a sample correction interval including:

a means for multiplying said number of samples in a one of said target periods by a base two number; and a means for dividing the absolute value of the product thereof by the difference between the number of samples in said one of said target periods and said reference value.

13. The pyrometer system of claim 1 wherein said signal processor means further comprises means for generating an array of new sample signals of both of said optical beam temperature signals and said optical sub-beam temperature signals and compares each of said new temperature signals with a corresponding stored temperature signal, said signal processor means further including means for replacing the associated one of said stored temperature signals with said new temperature signal if a difference therebetween exceeds a threshold value of signal noise in said optical beam temperature signal and said new value of said optical beam signal is less than said stored value of said optical beam temperature signal.

14. The pyrometer system of claim 13 wherein said signal processor means further comprises means for replacing said stored value of optical beam temperature with a value computed by summing said new and stored values of optical beam temperature signals and dividing said sum by eight.

15. The pyrometer system of claim 13 wherein said signal processor means further comprises a means for measuring signal noise in said target optical beam energy signals.

16. A pyrometer system for measuring the temperature of a remote target that periodically moves relative to said pyrometer system during a target period, said system comprising:

a sensor means for providing electrical signal equivalents of an end of each of said target periods;

an optical filter means for receiving a portion of a target optical beam having a spectral width and passing therethrough an optical sub-beam having a portion of said optical beam spectral width, both said optical beam and said optical sub-beam having a target emitted component, a target reflected component and a flame component occurring randomly during said target period;

first and second detector means for providing electrical signal equivalents of measured energy in said optical beam and said optical sub-beam;

a memory means for storing signals indicative of a plurality of reflection corrected target temperature signals corresponding to associated ones of a plurality of reflection corrected energy signal magnitudes;

a means for sampling said optical beam electrical signals and said optical sub-beam electrical signals at selected phases of a target period;

a means, for each of said phases, for generating reflection corrected energy signals from said optical beam and optical sub-beam energy signals;

a means, for each of said phases, for correlating said sampled reflection corrected energy signals with corresponding reflection corrected target temperature signals;

a means for comparing, for each of said phases, reflection corrected target temperature signals sampled in a first target period with corresponding reflection corrected target temperature signals sampled in a subsequent target period;

a means for retaining, for each of said phases, said reflection corrected target temperature signal from said subsequent target period if said subsequent target period reflection corrected target temperature signal is less in magnitude than said reflection corrected target temperature signal from said first target period;

a means for computing an average value of said retained reflection corrected target temperature signals; and a means for outputting an alarm signal should said average reflection corrected target temperature signal exceed a threshold value.

17. The pyrometer system of claim 16 wherein said signal processor means further comprises means for computing an average peak value of said reflection corrected temperature signal for a one of said periods.

18. The pyrometer system of claim 17 wherein said target has a plurality of elements each of which optically communicate with said optical sensor means during one of said target periods, said signal processor means further comprising means for computing said average peak value of said reflection corrected temperature signal including means for summing said peak values over a one of said periods and dividing the number of signal samples per period by the number of said target elements.

19. A method of measuring the temperature of a remote target that periodically moves relative to a pyrometer system during a target period, said method comprising the steps of:

providing electrical signal equivalents of an end of each of said target periods;

generating a target optical beam having a spectral width;

generated, by means of an optically filter, an optical sub-beam having a portion of said target optical beam spectral width, both said optical beam and said optical sub-beam having a target emitted component, a target reflected component and a flame component occurring randomly during said target period;

providing electrical signal equivalents of measured energy in said optical beam and said optical sub-beam;

storing signals indicative of a plurality of reflection corrected target temperature signals corresponding to associated ones of a plurality of reflection corrected energy signal magnitudes;

sampling said optical beam electrical signals and said optical sub-beam electrical signals at selected phases of a target period;

generating, for each of said phases, reflection corrected energy signals from said optical beam and optical sub-beam energy signals;

correlating, for each of said phases, said sampled reflection corrected energy signals with corresponding reflection corrected target temperature signals;

comparing, for each of said phases, reflection corrected target temperature signals sampled in a first target period with corresponding reflection corrected target temperature signals sampled in a subsequent target period;

retaining, for each of said phases, said reflection corrected target temperature signal from said subsequent target period if said subsequent target period reflection corrected target temperature signal is less in magnitude than said reflection corrected target temperature signal from said first target period;

computing an average value of said retained reflection corrected target temperature signals; and outputting an alarm signal should said average reflection corrected target temperature signal exceed a threshold value.

20. The method of claim 19 further comprising further comprising the steps of comparing the number of signal samples in a one of said target periods and comparing said sample number with a reference value therefor, and correcting the number of samples in subsequent target periods to equal said reference value.

21. The method of claim 20 wherein, if said reference value is greater than said number of samples in one of said periods, said comparing step further comprises the steps of:

generating from an array of uncorrelated signal samples an array of correlated signal samples the number of which is equal to said sample number reference value; and providing repeated samples in accordance with a method comprising the steps of:

```
set CNT = CPn
for (n = 1, m = 1 to m = Cn)
{
    Tuc(m) = Tu(n)
    Tfc(m) = Tf(n)
    Tuc(m) = Tu(n)
    m = m + 1
    if n*16 > = CNT)
    {
        Tuc(m) = Tu(n)
        Tfc(m) = Tf(n)
        Tuc(m) = Tu(n)
        CNT = CNT + Cln
    }
    m = m + 1
    n = n + 1
}
``` where

CNT corresponds to a selected signal sample phase for a correction signal sample, CPn corresponds to the first one of said correction signal samples, Cln corresponds to an interval for said correction signal samples, Tuc(m) corresponds to an array of correlated signal samples of said optical beam temperature signals, Tfc(m) corresponds to an array of correlated signal samples of said optical beam temperature signals, Ttc(m) corresponds to an array of said optical sub-beam temperature signals, Tu(n) corresponds to an array of non-correlated samples of said optical beam temperature signals, Tf(n) corresponds to an array of non-correlated samples of said optical beam temperature signals, Tt(n) corresponds to an array of non-correlated samples of said optical beam temperature signals.

22. The method of claim 20 wherein, if said sample number reference value is less than said number of samples in one of said periods, said comparing step further comprises the steps of;

generating from an array of uncorrelated signal samples an array of correlated signal samples the number of which is equal to said sample number reference value; and eliminating samples in accordance with a method comprising the steps of:

```
set CNT = CPn
for (n = 1, m = 1 to m = Cl)
{
if n*16 > = CNT
{
CNT = CNT + CLn
n = n + 1
}
Tuc(m) = Tu(n)
Tfc(m) = Tf(n)
Tuc(m) = Tu(n)
m = m + 1
n = n + 1
}
``` where

CNT corresponds to a selected signal sample phase for a correction signal sample, CPn corresponds to the first one of said correction signal samples, Cln corresponds to an interval for said correction signal samples, Tuc(m) corresponds to an array of correlated signal samples of said optical beam temperature signals, Tfc(m) corresponds to an array of correlated signal samples of said optical beam temperature signals, Ttc(m) corresponds to an array of said optical sub-beam temperature signals, Tu(n) corresponds to an array of non-correlated samples of said optical beam temperature signals, Tf(n) corresponds to an array of non-correlated samples of said optical beam temperature signals, Tt(n) corresponds to an array of non-correlated samples of said optical beam temperature signals.

\* \* \* \* \*